United States Patent [19]

Bechet

[11] Patent Number: 4,901,358
[45] Date of Patent: Feb. 13, 1990

[54] METHOD OF COMPARING A HANDWRITING WITH A REFERENCE WRITING

[75] Inventor: Louis Bechet, Douvaine, France

[73] Assignee: Battelle Memorial Institute, Geneva, Switzerland

[21] Appl. No.: 256,090

[22] Filed: Oct. 7, 1988

Related U.S. Application Data

[63] Continuation of Ser. No. 9,332, filed as PCT CH86/00051 on Apr. 18, 1986, published as WO86/06525 on Nov. 6, 1986, abandoned.

[30] Foreign Application Priority Data

Apr. 26, 1985 [CH] Switzerland ................ 1788/85

[51] Int. Cl.⁴ .............................................. G06K 9/00
[52] U.S. Cl. .......................................... 382/3; 382/13
[58] Field of Search ........................... 382/3, 13, 34; 178/17–19

[56] References Cited

U.S. PATENT DOCUMENTS

| | | |
|---|---|---|
| 3,699,517 | 10/1972 | Dyche . |
| 4,040,012 | 8/1977 | Crane et al. . |
| 4,128,829 | 12/1978 | Herbst et al. . |
| 4,363,023 | 12/1982 | Bechet ................. 382/59 |
| 4,397,033 | 8/1983 | Bechet .................. 382/3 |
| 4,495,644 | 1/1985 | Parks et al. ........... 382/13 |
| 4,646,351 | 2/1987 | Asbo et al. ............ 382/13 |
| 4,809,195 | 2/1987 | Bechet .................. 382/3 |

OTHER PUBLICATIONS

Herbst, "Automatic Signature Verification Based on Accelerometry", 1981.

Primary Examiner—Leo P. Picard
Assistant Examiner—Lincoln Donovan
Attorney, Agent, or Firm—Cushman, Darby & Cushman

[57] ABSTRACT

A method of comparing a handwriting with a reference writing by the measurement of signals $V_x$ and $V_y$ characteristic of the speed components along the abscissa and ordinate respectively of a rectangular co-ordinate system. Each speed signal $V_x$ and $V_y$ of the handwriting and the reference writing are divided into discreet time segments of the movements which produced the writing, the position of each such segment of the writing being coordinated with the corresponding segments of the movement of the reference writing, and determining a correction factor which is dependent upon the time variation between each movement segment of the handwriting and the corresponding movement segment of the reference writing.

2 Claims, 6 Drawing Sheets

METHOD OF COMPARING A HANDWRITING WITH A REFERENCE WRITING

This is a continuation of application Ser. No. 009,332, filed as PCT CH86/00051 on Apr. 18, 1986, published as WO86/06525 on Nov. 6, 1986, which was abandoned upon the filing hereof.

This invention relates to a method of comparing a handwriting with a reference writing by the measurement of signals $V_x$ and $V_y$ characteristic of the speed components along the abscissa and ordinate respectively of a rectangular co-ordinates system, such signals being recorded during the tracing of the respective writings, each speed signal $V_x$, $V_y$ of the writing to be compared and of the reference writing being divided into various discrete time segments of the movement which produced the writing, the position of each such segment of the writing to be compared being co-ordinated with the corresponding segment of the movement of the reference writing, a correction factor being determined which is dependent upon the time variation between each movement segment of the writing to be compared and the corresponding movement segment of the reference writing.

The signals recorded in the measurement of handwriting speed are as characteristic of the person as are fingerprints or voice timbre and voice intonation. The rate of tracing discrete characters can also be compared with a catalogue of the tracing of all the alphanumerical characters. A comparison of this kind can serve as a method of character identification without using image recognition. Identification of this kind could be used to replace the keyboard as a means of communicating with a computer.

Referring more particularly to signatures, the use of credit or charge cards for payment and cash withdrawal makes it an ever more pressing problem, both for card users and for banks, to validate the card and identify the cardholder.

At present signatures are verified by graphical comparison based on an identity document. However, some signatures are relatively easy to copy and there are forgers skilled enough to imitate the writing so as to give the illusion of a genuine signature. There are of course other areas where signature-based identification of a person can be envisaged.

Various proposals have been made for verifying signatures on a basis other than the style of writing, using information technology means to make a comparison. For example, it has already been proposed to make use of the accelerations or pressure of a pen when a signature is being traced. However, the resulting signals are confused by measurement noise and do not therefore offer adequate security in operation, for signature verification is linked with two equally disadvantageous risks—acceptance of a false signature as genuine and refusal of a genuine signature.

It has therefore been proposed to measure pen speed, which is free from noise, as disclosed in U.S. Pat. Nos. 4,363,023 and 4,397,033. Verification is based on comparing the curves of speed components recorded along two axes of a rectangular co-ordinates system, the speeds being characteristic of two signatures, one such signature being the reference signature while the other signature is the signature to be verified against the reference signature.

As previously stated, the comparison result must have a high degree of certainty in order both to avoid false signatures and also to recognize genuine signatures, and so processing is a delicate matter. Also, if a reliable solution of the problem of use in areas such as credit and charge cards is to be reached, processing of the recorded speed signals must not of course take longer than some 20 to 30 seconds since it is unrealistic to think that users will tolerate any appreciably longer period. In the light of the double safeguard necessary, this time requirement makes the problem even more difficult to solve.

A signature, more particularly its speed variations, is indisputably characteristic of the individual, but these characteristics are not immutable. Indeed, it can even be said that the same person never makes two identical signatures with regard to both style of writing and speed of writing. The speed signal characteristic curves do not therefore coincide because of mainly time-linked changes.

This problem is known and a solution has already been proposed, as disclosed in U.S. Pat. No. 4,040,012. According to the latter solution of the problem, the measured signal, which is a time-linked pressure signal, is broken down into at least two segments. Each such segment is shifted from behind to in front of the corresponding reference signal segment in consecutive steps to provide maximum correlation. In a second phase, with the segments disposed opposite one another in accordance with the previously established maximum correlation, the time scale and, therefore, the speed of the segment is varied in consecutive steps and a second correlation is established. The maximum correlations for each segment are then combined to give a maximum correlation value and the same is compared with a reference value to ensure that the maximum correlation value does not differ from the reference value by more than a predetermined minimum.

In the solution proposed by U.S. Pat. No. 4,040,012, the correlation technique used to centre and scale the measured-signal segments relatively to the reference-signal segments is also used for signature recognition. In practice this form of recognition is equivalent to comparing the shape of the graphic insignia to the extent that it uses criteria relating to the general shape of the curves. Such criteria are the same as those enabling a human observer to centre and scale the curves by a visual comparison thereof.

Consequently, using these criteria to check the signature against a reference comes down to comparing the general shape of the curves, but this is inadequate, for two people making the same signature produce speed curves which have the same general shape—i.e., which have the same number of peaks having similar shapes. Consequently, a forged signature may give as high a correlation factor as the genuine signature.

The correlation criterion, which is useful for centering and adjusting the time scale of the various curve segments relatively to the corresponding reference segments, is therefore unsuitable for the actual checking or recognition operation since it readily leads to a forged signature being taken to be a genuine signature.

It is precisely the object of this invention to help to solve all the problems hereinbefore set out with a high degree of security. So far as signatures are concerned, the solution provided by the invention helps to eliminate false signatures, even though they may resemble one another in their style of writing, and to verify a high percentage of genuine signatures, including signatures whose dynamics are not particularly striking, in a very short time.

This invention therefore relates to a method of comparing a handwriting with a reference writing and to use of the method.

The development of the method according to the invention is the result of observation based on a systematic analysis of procedures connected with the handwriting, and more particularly signatures, of various individuals. The observation has helped to reveal some constants and the form of the unstable parameters in the normal course of such procedures, so that rules can be devised which both increase security and speed up the procedure of comparing curves which are, however, not identical.

These observations, more particularly so far as signatures are concerned, show that the signature-generating mechanism breaks down into a number of segments whose number varies from one signature to another but which is constant for a predetermined signature. Extraordinary random signals are found to occur between the segments. However, part of the signal may sometimes be found to be missing from inside each segment. Two kinds of alteration are found for each segment, namely a variation of segment position relatively to the position of adjacent segments, and a variation of segment duration. The direction and magnitude of the alterations of a segment are independent of those of the adjacent segments.

These observations led to the idea of standardizing each segment relatively to the corresponding segments of the reference signature, to which end the segments of the signature to be verified are made to coincide with the reference signature segments and their respective timescales are modified in dependence upon those of the reference.

It was found that the duration of the segments of the signatures of all individuals lies between 500 and 700 ms. Tests showed that satisfactory results are obtained by adopting an average duration of 600 ms.

Processing the speed curves in 600 ms segments and standardization thereof reduces the processing time to less than 30 seconds while providing high reliability, the actual comparison operation on the basis of standardized segments being highly simplified by the pre-standardization.

Speed signals are obtained along two axes of rectangular co-ordinates by electromagnetic induction with the use of a pen having a permanent magnet which has an axial magnetic field, variable voltages being produced which are proportional to the speed components along the two axes of rectangular co-ordinates in two parts of windings crossing one another at right-angles below the plane of the writing surface. U.S. Pat. Nos. 4,363,023 and 4,397,033 describe such a system in detail and reference can be made to these publications if more is required to be known about the means used to produce the speed curves, the latter means not being described here because they are outside the scope of the invention and are not necessary for an understanding thereof.

Signature verification by the comparison method according to the invention calls for the recording of the characteristic speed curves of the signature of the person concerned in a computer memory, in the memory of a memory card, which comprises a semiconductor memory, on a magnetic track or on any other appropriate support. In practice, and to ensure that the reference is representative only of a single signature specimen which will never be reproduced identically, a characteristic average of a number of signatures is produced; this is more representative of signature constants and helps to eliminate a number of exceptional signals and to compensate for the accidental absence of some segment portions, an event referred to in the foregoing. This reference is prepared from a number of signatures, as a rule from less than five signatures, by dividing such signatures into 600 ms sequences and proceeding to their mutual standardization as hereinbefore described, whereafter two speed curves $V_x$ and $V_y$ respectively which correspond to the average of all the curves are prepared.

An embodiment of the practice of the method according to the invention is illustrated diagrammatically and by way of example in the accompanying drawings wherein.

Figure 1:
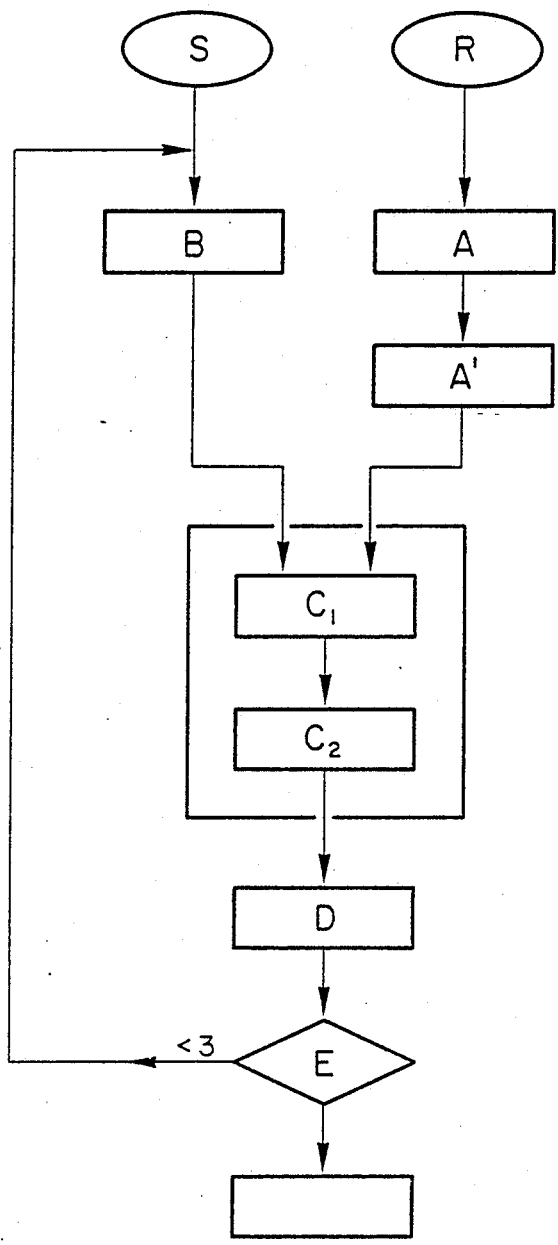
FIG. 1 is a general block schematic diagram of the method.

FIG. 1 illustrates in diagrammatic form how the method of comparing a signature with a reference signature according to the invention proceeds. A rectangle A represents the reading of the reference R used for comparison and a rectangle B represents how the signature S is obtained in the form of two speed curves $V_x$ and $V_y$. A rectangle A' denotes a possible pre-processing of the referencing, a feature which lies outside the scope of this invention. The signature seed curves associated with the rectangle B are in a rectangle $C_1$ divided into segments and time-staggered as previously described with reference to the corresponding segments of the reference read by the rectangle A. Segment lengths are equalized in a rectangle $C_2$. The signal segments thus standardized in the rectangles $C_1$ and $C_2$ are then compared with the reference segments in a rectangle D, whereafter the comparison results are transmitted to a decision-making diamond E which determines whether or not the comparison results are acceptable. The acceptance criteria are statistically determined so that the discrepancy between the reference and the signature being compared remains within acceptable security limits, with adequate flexibility to accept normal variations between two genuine signatures. Discrepancy adjustment therefore depends upon the signature sample used and upon its representativity.

The operations for standardizing the segments will now considered in greater detail, such operations proceeding by sequential searching for the offset of each speed signal segment of the signature to be verified from the corresponding reference segment.

Figure 2:
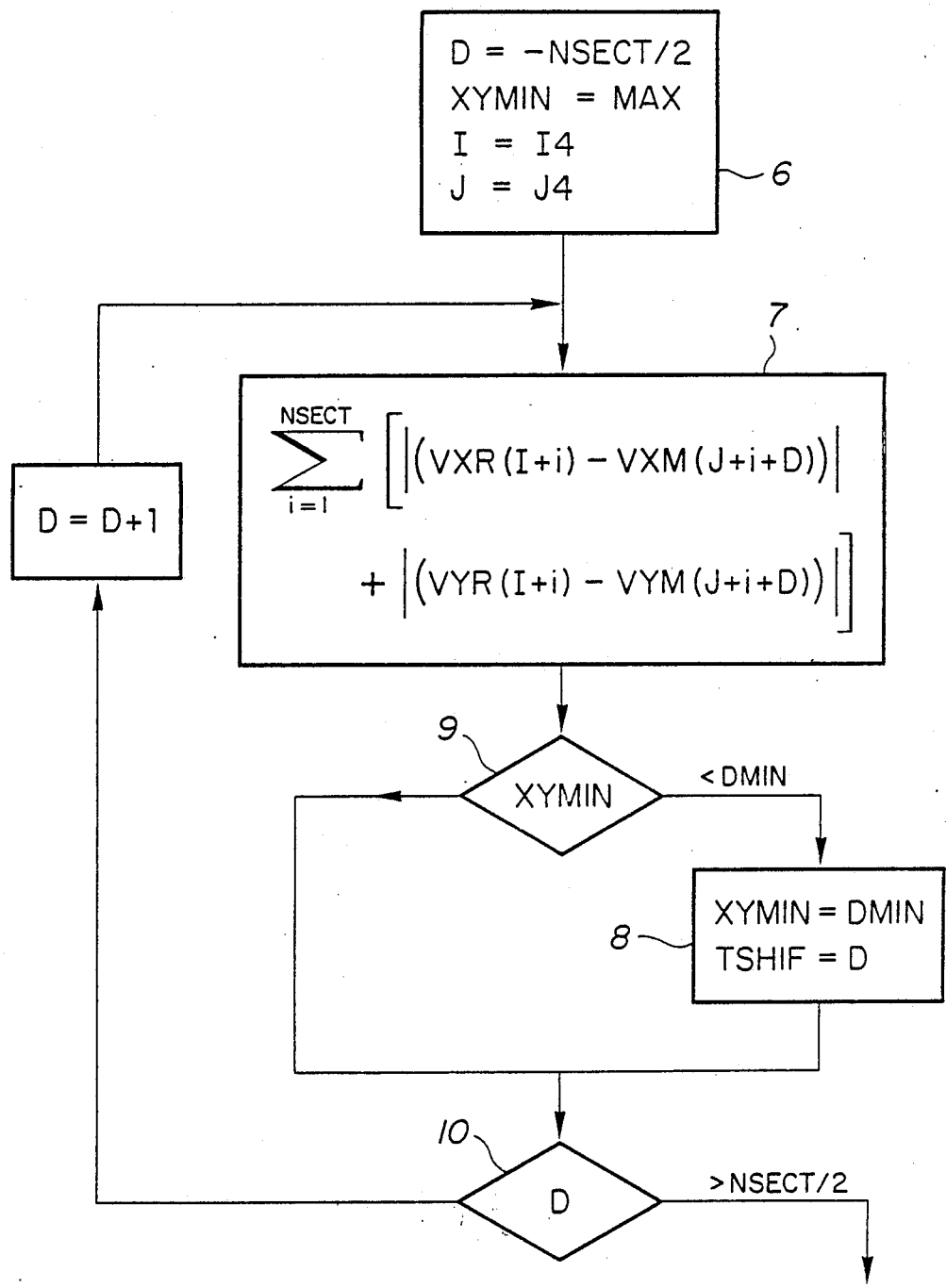
FIGS. 2-4 are operations tables for signal processing.

The actual offset search will be described with reference more particularly to the operations table shown in FIG. 2, wherein I4 corresponds to the index of the start of the particular segment considered of the reference signal, J4 corresponds to the index of the start of the segment corresponding to the measurement signal of the signature to be compared, D denotes the time offset and NSECT denotes the number of equal timescale steps by which each reference signal and measurement signal segment is divided to form the specimens analyzed.

To make the comparison, the measured-signal segment is first offset from the reference signal negatively by NSECT/2 steps, whereafter the measured-signal segment is shifted by one positive step to a number of steps also equal to NSECT/2.

At each offsetting step of the measured signal, a magnitude DMIN is calculated in rectangle 7, such magnitude corresponding to the sum of the two terms indicated in the rectangle 7, in which terms VXR and VYR are the speed components along the axes x and y respectively of the reference signal, and VXM and VYM are the corresponding speed components of the measured signal.

First, a value XYMIN=MAX is introduced into a memory represented by a rectangle 8. A comparison is made in the diamond 9 to see whether the value DMIN calculated in the rectangle 7 is less than the value XYMIN memorised in the rectangle 8. In the event of an affirmative response the right-hand arm of the diamond 9 transmits the value DMIN into the memory 8 with the corresponding value of D to replace the previous value and the lefthand arm of the diamond 9 instructs the comparison diamond 10 to advance by one step. If the value posted in the comparison diamond 10 is D>NSECT/2, the left-hand arm, which is looped with the input of the rectangle 7, steps on the measured signal by a step D=D+1 and the same operation as described restarts until the comparator diamond 10 displays a value D>NSECT/2, the right-hand arm of the diamond 10 then being actuated and the offsetting of the measured signal ceasing.

Upon the completion of this operation the signal corresponding to the measured segment is positioned relatively to the signal of the corresponding segment of the reference by adopting that offset D memorized in the rectangle 8 for which the lowest difference DMIN was obtained.

There then begins the second stage of the standardization procedure comprising determining the time factor needed to correct the measured-signal segment for the sum of the amplitude differences of the X and Y speed components of the measured-signal segment to be minimal as compared with the corresponding sum of the like segment of the reference signal.

To this end the sums mentioned are compared by the application to each measured-signal of sample a time factor which increases in steps of the multiplication factor of 0.05 in a range of from 0.75 to 1.25 times the duration (length) of the reference signal segment.

Figure 3:
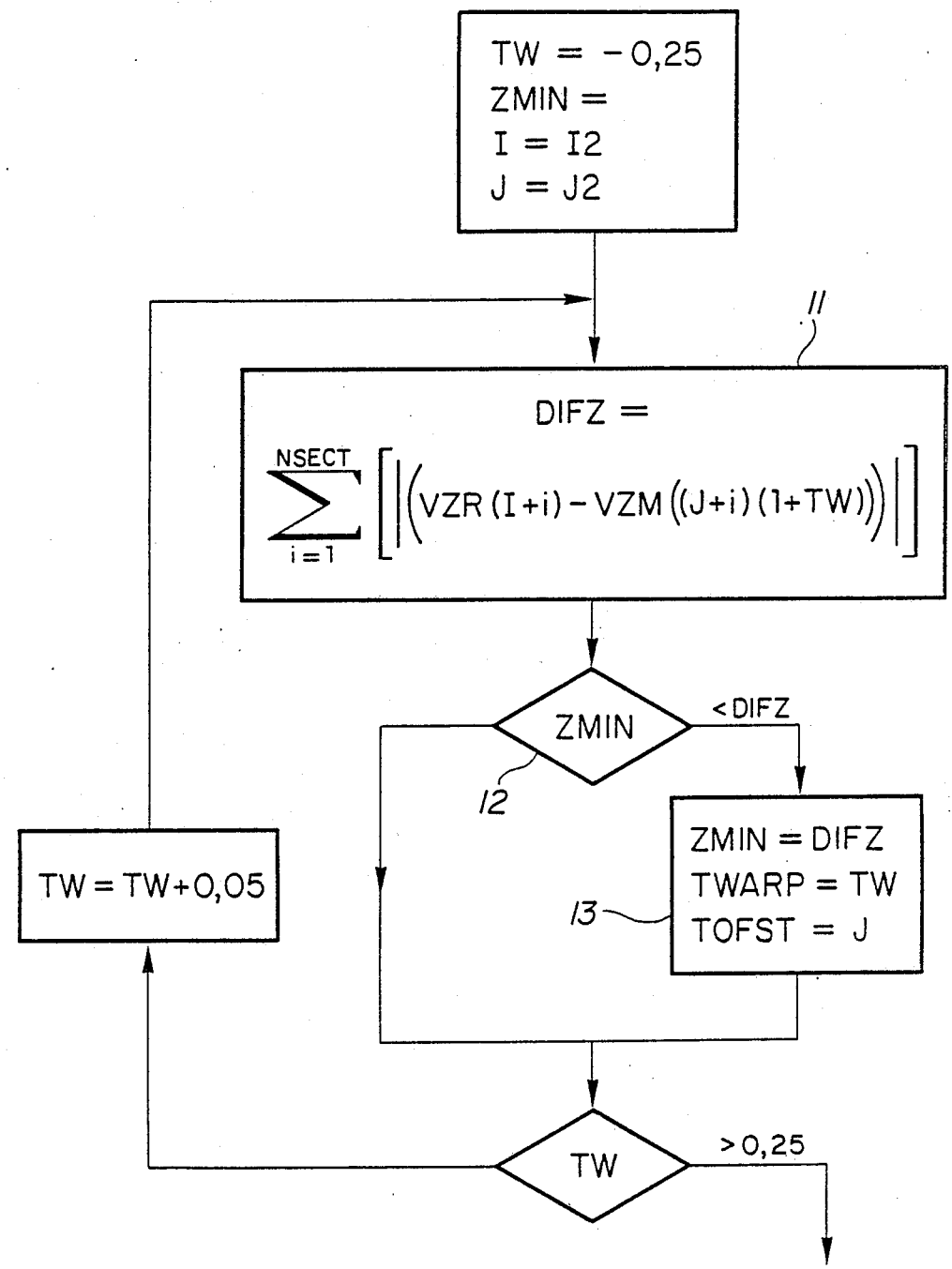

Referring to the operation table in FIG. 3, I2 corresponds to the index of the start of the reference signal segment and J2 corresponds to the index of the start of the measured-signal segment, TW corresponds to the time factor and NSECT corresponds to the number of increments of the 0.05 multiplication factor in the range extending from −0.25 to +0.25 times the duration of the reference signal segment.

For each value of the multiplication factor TW a magnitude DIFZ is calculated in rectangle 11 of the operations table of FIG. 3, the value DIFZ being the sum over the entire signal sequence of the differences between the amplitudes of the reference speed components VZR and the amplitudes of the measured-signal speed components VZM.

A comparison is made in a decision-making diamond 12 of the result of each operation arising from differences obtained for each time factor from the previous value stored in the memory 13. If the comparison shows that the value calculated in the rectangle 11 is smaller than the value in the memory 13, the new value is substituted therein for the former value, together with the corresponding time factor value TWARP=TW. After the operation of the rectangle 11 has been performed for the entire range of the values of the multiplication factor TW covering from −0.25 to +0.25 times the standard segment duration, the memory 13 therefore retains the smallest discrepancy with the corresponding time factor TWARP=TW. Simultaneously, the end of the comparison procedure in the indicated time factor range determines the start of the next segment of measured-speed signals J=TOFST which is an intermediate variable.

After each segment of the measured speed signals of the signature has been allotted an offset value D and a time scale multiplication factor TW, each speed signal segment is standardized by means of these two correction factors.

Figure 4:
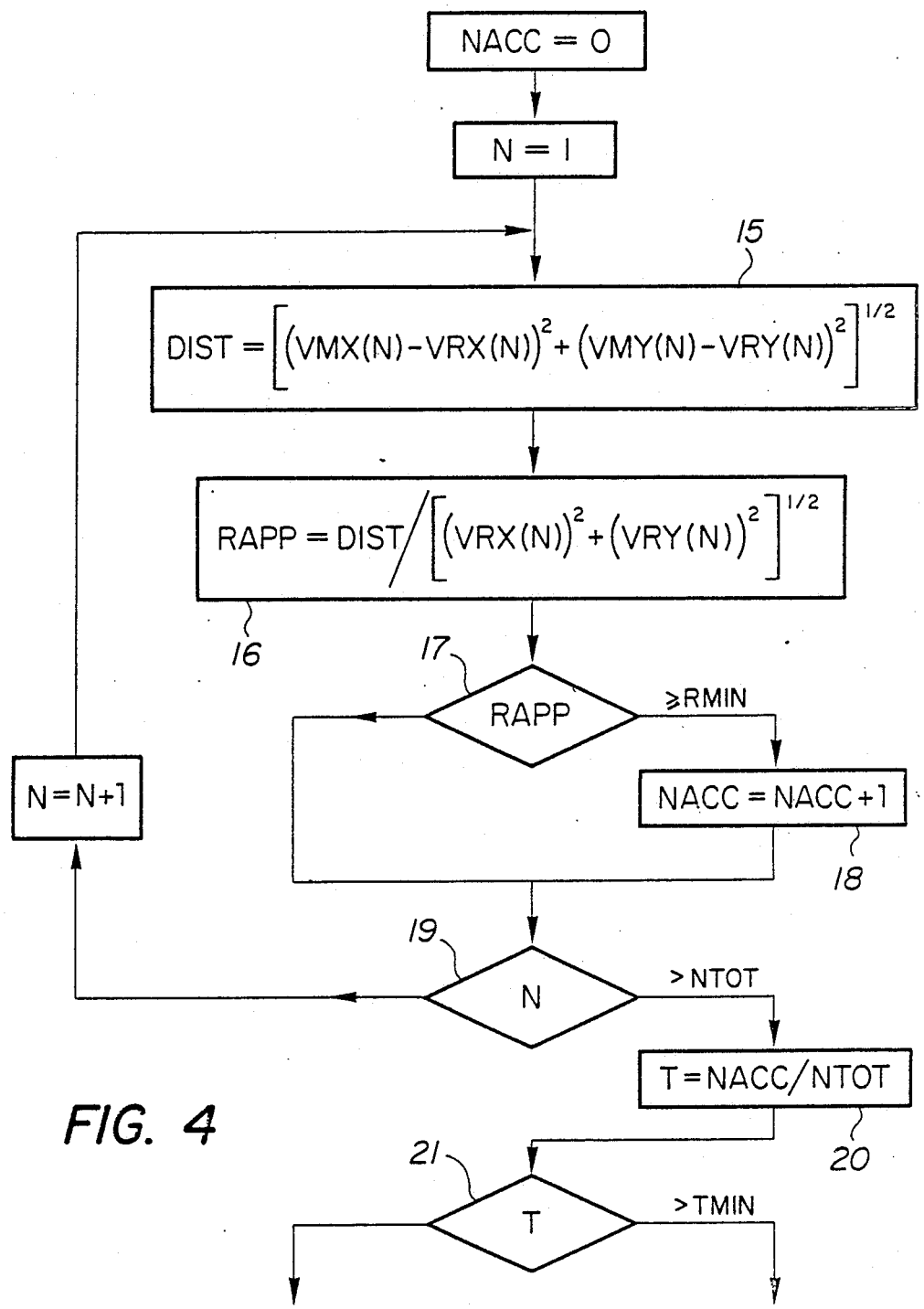

Consequently, the respective segments of the measured-signature speed signals are compared with those of the reference solely on the basis of the segments of the standardized measured speed signals. The comparison procedure will be described with reference to the operations table of FIG. 4.

The comparison procedure is based on calculation of the point-to-point distance in a plane defined by two axes Ox and Oy on which the speed components VX and VY of the measured and standardized signals are plotted.

In this plane the reference signal is represented by a position sequence $R_1, R_2, \ldots R_n$ of the signal speeds curve having as its co-ordinates the speed components VX and VY.

Position R1 of the latter curve, for example, has as co-ordinates the values of the speeds VRX and VRY at the time $t_1$. The collection of positions $R_1, R_2, \ldots R_n$ represents the hodograph of the reference signals.

The hodograph of the speed signals of the signature to be compared with the reference speed signals is traced in the latter plane, the hodograph being a sequence of positions $M_1, M_2, \ldots M_n$ representing speed components VMX, VMY at times $t_1, t_2, \ldots t_n$ respectively whose co-ordinates are the values of the speeds VMX, VMY at the times $T_1, T_2, \ldots T_N$ respectively.

The point-to-point distance corresponds to the euclidian distance between a point $M_1$ of the signature speed signals and a position $R_1$ of the reference speed signals serving as comparison element, the two positions being considered at the same time $t_1$.

For example, for a position $R_1$, the distance with the position $M_1$ corresponding to the same time $t_1$ and equal to the length of the vector $M_1R_1$ which is calculated by rectangle 15 by means of the formula therein. These distances are calculated for each position corresponding to the times $t_1, t_2, \ldots t_n$.

After the distance has been calculated for one position the result undergoes an acceptance test comprising two phases.

The first phase is carried out in rectangle 16 and resides in making the ratio between the distance calculated in the rectangle 15 and the module of the speed of the reference signal considered at the same time. This ratio is expressed as follows:

$$\text{RATIO} = \frac{M_1 R_1}{O_1 R_1}.$$

In the second phase of the acceptance test the ratio delivered by the rectangles 16 is transferred to a decision-making diamond 17 which decides to accept the ratio relating to the particular point considered of the speed signal hodograph of the signature when such ratio is below a predetermined acceptance threshold. For example, if the acceptance threshold is 0.5, a position at the time $t_1$ of the hodograph of the speed signals of the signature is accepted if the distance between such position and the position at the same instant $t_1$ of the hodograph of the reference speed signals is at most equal to half the distance between the origin and such position at the time $t_1$ of the hodograph of the reference speed signals.

Every position below the acceptance threshold is summated in rectangle 18. The diamond 19 totalizes all the positions for which the rectangle 16 has calculated a ratio. For as long as the total of such positions, whether, or not accepted, has not reached a predetermined value, the diamond 19 transmits by way of its left arm an instruction to move to the next position of the hodograph of the speed signals of the signature to be compared, and the same sequence of operations is repeated for each of the other positions of the hodograph until the number of positions reaches the predetermined number posted by the diamond 19.

The right-hand arm of the diamond 19 is then activated and a rectangle 20 calculates the level of accepted positions NACC relatively to the total position number NTOT. When the level or rate exceeds a predetermined threshold posted in a diamond 21, the right-hand arm thereof is activated and the signature is accepted, otherwise the left-hand arm is actuated and the signature is rejected. Signature acceptance can proceed in various ways according to the use required to be made of this form of checking or recognition, the general aim being to make sure that the unknown person who has signed and whose signature has been compared with the signature of a known person is in fact that known person, using checking or recognition means specific to that person and not an encoding element attributed arbitrarily to such person and capable of being stolen. In the case of this invention, even if the reference is carried by a magnetic track or by a passive memory in the possession of the actual person and therefore capable of being stolen, no other person can use it because the dynamics of the signature used here as comparison element cannot be acquired by a third party even if such third party manages to forge the style of writing of the signature.

Figure 5:
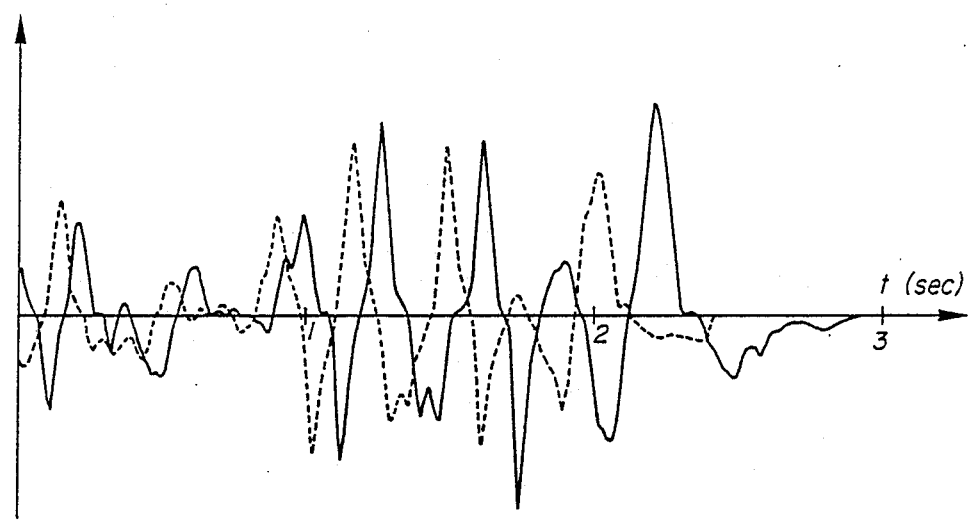
FIGS. 5 and 6 are diagrams of signature speed recording.
Figure 6:
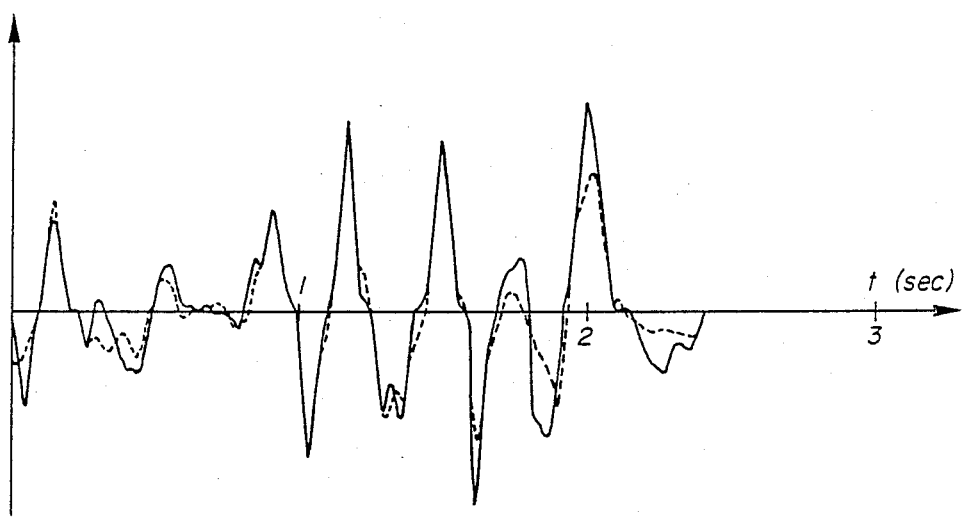

The diagrams in FIGS. 5 and 6 show the usefulness of the method according to the invention. FIG. 5 shows the speed diagrams of two signatures, the broken-line signature being the reference signature and the other being the signature to be compared. Both signatures are made by the same person. Because of the offsets between the comparable signals, correlation between the peaks of the two curves is very low, being only 6%. Clearly, it is impossible on this basis to determine an acceptance rate if the correlation between the peaks of two curves deemed to correspond is as low as 6%.

FIG. 6 illustrates the same two curves, the reference being in broken line and the speed curve of the signature to be measured being in solid line, the latter signature having been pre-processed in accordance with the foregoing. In this case the correlation rate between the positions of the two curves is 72%.

It has been found that in practice the minimum correlation threshold can safely be set at 40%. It has been confirmed that even in the case of two signatures similar to the point of confusion with one another, one of them being genuine and the other false, the correlation rate does not exceed 20 to 30%. However, it is rare and accidental that anyone makes a signature with a correlation rate below 40%. The fact that the method according to the invention permits ready discovery of the fact that two signatures, although resembling one another completely graphologically, have not been made by the same person shows that the method according to the invention provides much greater security than the security provided by simple graphological comparison.

As previously stated, the process hereinbefore described in detail with reference to the comparison of the speed curves of two signatures, one of the signatures being a reference signature, can be applied to the comparison of other characteristic handwriting curves.

In this case it will be commoner to compare a curve with a catalogue of curves each corresponding to a letter or even to a syllable. Taking as an example the identification of a number of characters by their speed curve, in the method hereinbefore described the recorded curve is compared with each of the catalogued curves. This comparison will show that the recorded curve corresponds to the catalogued character whose curve has the highest rate of similarity to the recorded curve.

Figure 7:
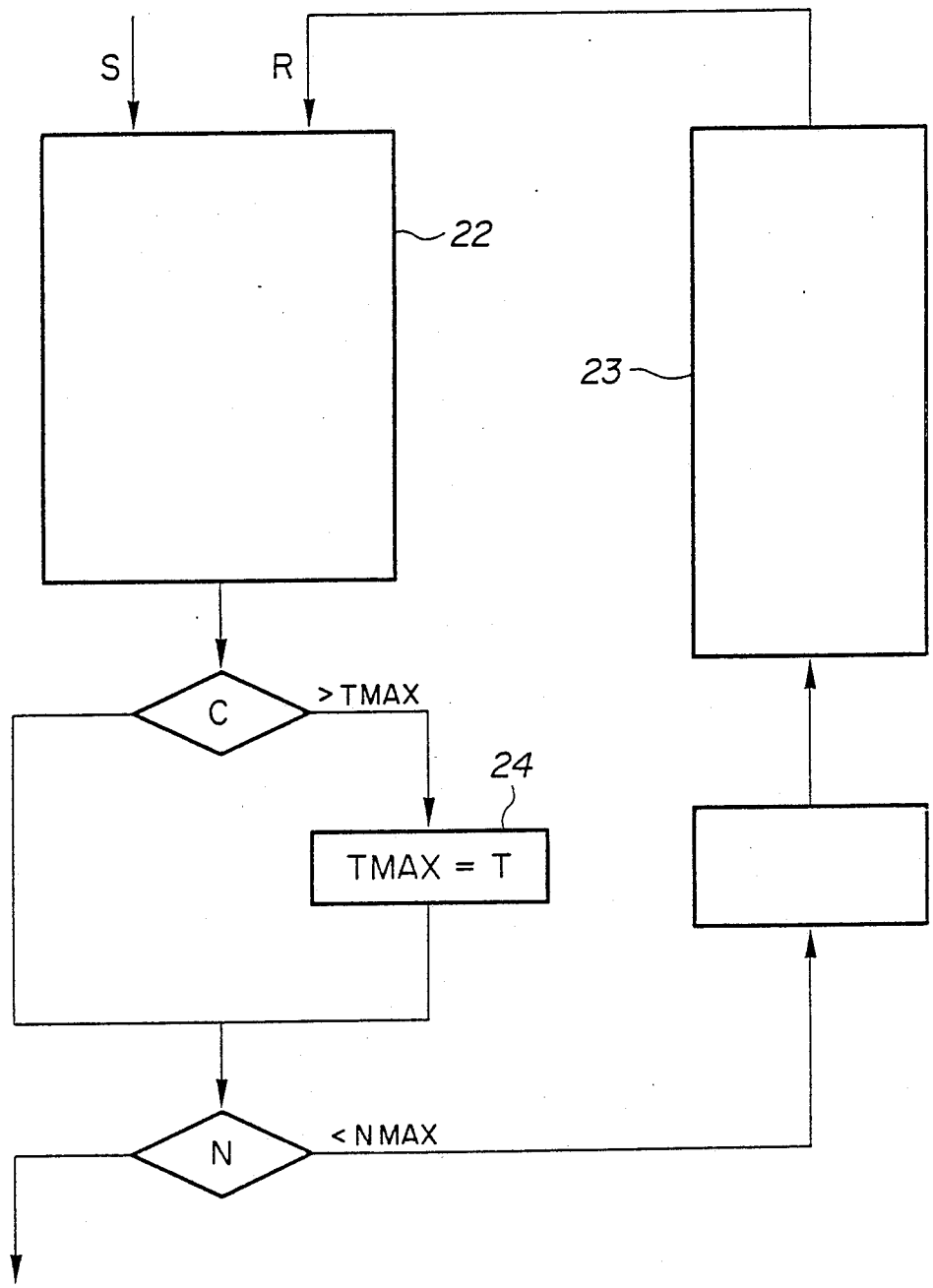
FIG. 7 is the operations table for a variant of the processing illustrated in FIGS. 2-4.

The general diagram in FIG. 7 shows the operation of the method according to the invention when the comparison is made not in respect of a curve, as in the case of signature verification, but in relation to a catalogue. The operations of standardizing the curve to be compared relatively to the reference curve are identical to the operations hereinbefore described and so will not be further described here. The complete processing is carried out in a rectangle 22 comprising two inputs S, R for the curve to be compared and for the reference curve, respectively. The second input R is connected to the curve catalogue 23 which outputs the catalogued curves consecutively at the second input R.

Output D of rectangle 22 therefore delivers a value corresponding to the similarity level arising from the comparison between the two curves. Such level in the case of the first compared curve corresponds to the obtainable maximum and a comparison diamond C will automatically have its right-hand arm actuated to output to a rectangle 24 the value T of the level corresponding to TMAX. When the result of the similarity level arising from the comparison between the recorded curve and the second curve of the catalogue 23 is obtained, the diamond C compares this value with the level memorized in the rectangle 24. If such value is greater, it replaces the value previously stored and a comparison diamond N is activated, otherwise the comparison diamond N is activated by the left-hand arm of the comparison diamond C. The diamond N determines whether the number of comparisons made on the same measured curve is equal to or smaller than the number of curves of the catalogue 23. If such number is smaller, the right-hand arm of the diamond N is actuated and calls on the next curve of the catalogue 23. When the number is equal to the number of curves of the catalogue 23, the left-hand arm of the diamond N indicates the checked or recognized curve which corresponds to the curve whose resemblance level is greatest and which is stored in the rectangle 24.

What is claimed:

1. A method of verifying the authenticity of a handwritten sample by use of a reference handwriting comprising the steps of:
   (a) measuring and recording speed component signals $V_x$ and $V_y$ of a reference handwriting and a handwritten sample, respectively, where $V_x$ and $V_y$ are the speed component signals along the abscissa and ordinate of a rectangular coordinates system;
   (b) dividing each speed component signal of the movement which produced the writing into equal discrete time segments;
   (c) coordinating the position of each said segment of the handwritten sample with the corresponding segment of the reference writing;
   (d) tracing vectors from the signals $V_x$ and $V_y$ corresponding to said discrete tine segments in the plane bounded by coordinate axes OX and OY to produce the hodograph of respectively the reference handwriting and the handwritten sample;
   (e) selecting position $R_1$ to $R_n$ of the reference writing hodograph and positions $M_1$ to $M_n$ of the handwritten sample hodograph at times $t_1$ to $t_n$;
   (f) calculating the Euclidian distance between the positions of the two hodographs at a given time t, the distance corresponding to the length of the vector MR;
   (g) dividing the length of the vector MR by the length of the vector OR;
   (h) comparing the value of the ratio MR/OR to a predetermined acceptance threshold; and
   (i) repeating steps (e) to (g) for all values of M and R corresponding of values $t_1$ to $t_n$ and tabulating the number of positions at which the value of the ratio MR/OR is acceptable.

2. A method according to claim 1 wherein said handwriting is a signature, which signature is compared with a reference signature.

* * * * *